(12) United States Patent
Richter

(10) Patent No.: US 10,200,518 B2
(45) Date of Patent: Feb. 5, 2019

(54) HOLDING DEVICE, IN PARTICULAR FOR MOBILE PHONES

(71) Applicant: Harald Richter, Engelsbrand (DE)

(72) Inventor: Harald Richter, Engelsbrand (DE)

( * ) Notice: Subject to any disclaimer, the term of this patent is extended or adjusted under 35 U.S.C. 154(b) by 0 days.

(21) Appl. No.: 15/794,095

(22) Filed: Oct. 26, 2017

(65) Prior Publication Data

US 2018/0262603 A1 Sep. 13, 2018

(30) Foreign Application Priority Data

Mar. 8, 2017 (DE) .................... 20 2017 001 222 U
Aug. 31, 2017 (DE) .................... 20 2017 004 562 U

(51) Int. Cl.
*A45F 5/00* (2006.01)
*H04M 1/04* (2006.01)
*H04B 1/3827* (2015.01)
*H04B 1/3888* (2015.01)

(52) U.S. Cl.
CPC ................. *H04M 1/04* (2013.01); *A45F 5/00* (2013.01); *H04B 1/3888* (2013.01); *A45F 2200/0516* (2013.01); *A45F 2200/0525* (2013.01); *H04B 2001/3861* (2013.01)

(58) Field of Classification Search
CPC ............................... H04M 1/04; H04B 1/3888
See application file for complete search history.

(56) References Cited

U.S. PATENT DOCUMENTS

| 8,844,098 B2 * | 9/2014 | Karmatz | ................. B25G 1/102 16/422 |
| 2012/0042476 A1 | 2/2012 | Karmatz | |
| 2014/0357450 A1* | 12/2014 | Sylvain | .............. A63B 71/0622 482/8 |

OTHER PUBLICATIONS

European Patent Application No. 17001724.8-1216; European Search Report dated May 4, 2018; 2 pages.

* cited by examiner

*Primary Examiner* — Nguyen T Vo
(74) *Attorney, Agent, or Firm* — John H. Thomas, P.C.

(57) ABSTRACT

A holding device for smartphones or similar devices is adjustable between a flat collapsed resting position and an extended operating position and comprises a device-side end part connected or connectable to the device, and an outer end part. A resilient construction element connects both end parts and holds the outer end part spaced apart from the device-side end part in the operating position. In the resting position, the resilient construction element is flat compressed and the outer end part is lockable on the device-side end part. The outer end part is configured as a gripping piece. The resilient construction element can be configured as a helically coiled compression spring or tension spring or as a body of resilient foam or as a mechanical variable length element.

5 Claims, 5 Drawing Sheets

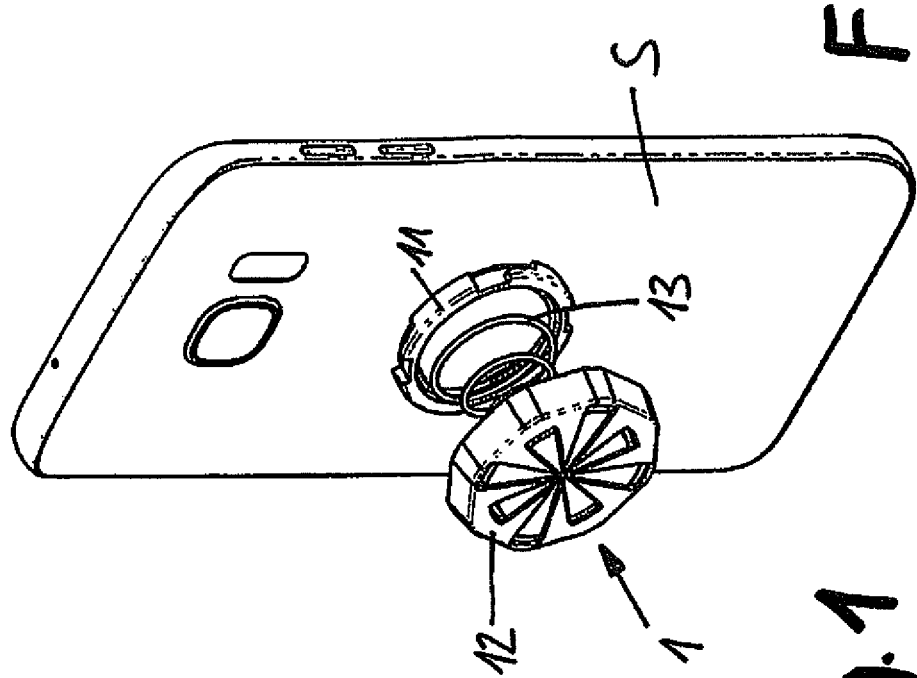
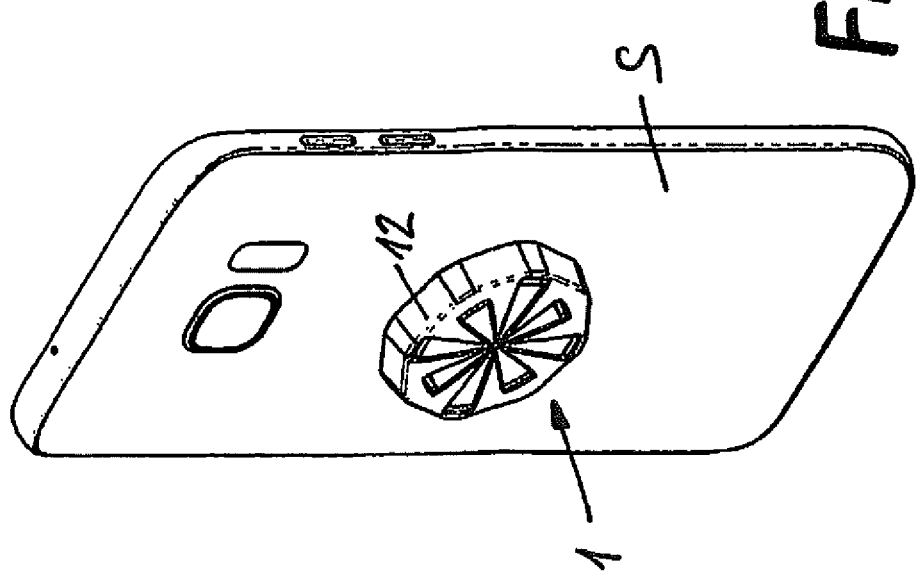

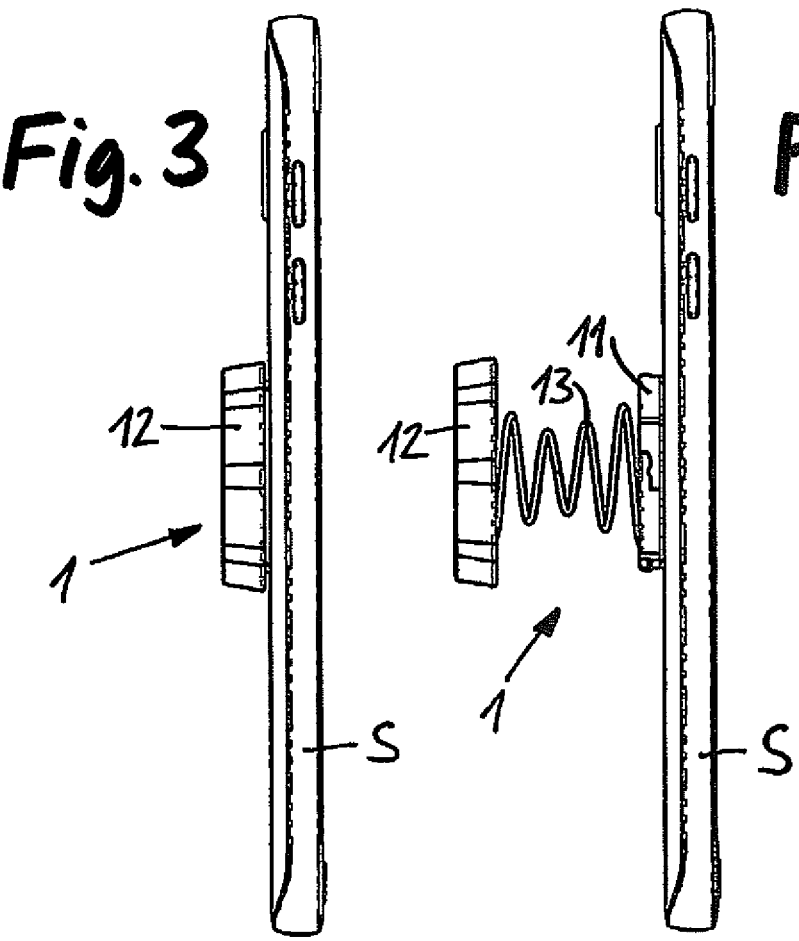

HOLDING DEVICE, IN PARTICULAR FOR MOBILE PHONES

The present application claims the priority of German Patent Application No. 20 2017 001 222.7, filed Mar. 8, 2017, and German Patent Application No. 20 2017 004 562.1, filed Aug. 31, 2017, the contents of both of which applications are incorporated by reference herein in their entirety.

The present invention relates to a holding device, in particular for mobile phones.

BACKGROUND

Mobile phones, particularly in the form of so-called smartphones, have continuously become larger in terms of their surface area in the interest of enlarging the display. Despite their low thickness, this makes them increasingly uncomfortable to hold because of their large width when they are grabbed on the edges with the fingers of the user. This feeling is especially strong when the user has to hold the smartphone for an extended period of time during use. This is even more true for small tablet computers that combine the functionality of smartphones and tablets.

Thus, it is desirable to have a holding device that can be attached to a smartphone or tablet computer to enable holding the device over an extended period of time in a comfortable manner, and to also improve protection against unintentional dropping of the device. In that, the holding device itself must not make the held device cumbersome to use.

U.S. Pat. No. 8,560,031 B2 discloses a holding device that is attachable, e.g. by bonding, to the backside of an MP3 media player, the holding device consisting of a button-like holding grip changeable between a flat collapsed position and an extended position, the holding grip comprising a socket part attachable to the MP3 media player, a lid and an accordion or bellows arranged therebetween. The lid can be latched to the socket in the flat collapsed position of the holding grip and can be actuated into an extended position by means of the resilient accordion. The accordion is conically tapered towards the socket in order to be collapsible into a flat form. However, it appears to be unsatisfactory that the accordion must necessarily be tapered towards the socket in order to be flat collapsible, and that the connection to the socket is weakened because of this reduced diameter, that the accordion further only allows for a relatively constricted extension, and that the holding device can only inconveniently be grabbed by persons with relatively thick fingers. In addition, this bears the risk of fatigue failure of the accordion.

SUMMARY

In contrast, it is an object of the present invention to provide a holding device that is adjustable between a flat collapsed resting position and an extended operating position wherein the holding device has a construction that is significantly easier to manufacture, has high mechanical stability and does not pose the risk of rapid wear due to fatigue failure.

According to the invention, this object is achieved by the arrangement defined in one of the independent claims 1 to 3. Advantageous embodiments and further developments of the invention form the subject-matter of the sub-claims.

According to the invention, provision is made for a holding device that can be attached to a smartphone or the like, or can be integrated into a housing thereof, consisting of an end part on the device side connectable to the housing of the device or formed integrally therewith, and an outer end part serving as a gripping piece, and a coil spring extending therebetween or another intermediate element. The end part serving as the gripping piece is lockable, in a flat compressed resting position of the holding device, with the device-side end part, for example by a latch or rotary lock, or even magnetically, wherein the coil spring is then compressed with the spring coils nested within one another, or the other intermediate element is flat compressed.

The connection of the two end parts by means of a coil spring allows a significantly larger extensibility of the gripping piece, and thus a significantly better gripability even for persons with thick fingers, without compromising the ability to flat collapse the device. A resilient intermediate element, for example made of plastic foam, allows for a good grip on the holding device in its operating position, nearly as good as with a solid body. In different embodiments, a mechanical intermediate element that is preferably spring-loaded is also possible.

BRIEF DESCRIPTION OF THE DRAWINGS

In the following, the invention will be described in further detail by way of exemplary embodiments with reference to the accompanying drawings. In the drawings:

FIG. 1 shows a perspective view diagonally from behind of a smartphone having attached thereto a holding device according to the invention in the resting position, FIG. 2 shows a view similar to FIG. 1 with the holding device having a coil spring in the operating position, FIG. 3 shows a side view of the smartphone with the holding device in the resting position, FIG. 4 shows a side view of the smartphone with the holding device with the coil spring in the operating position, FIG. 5 shows the holding device with the coil spring in the operating position, both shown separately.

DETAILED DESCRIPTION

Figure 6:
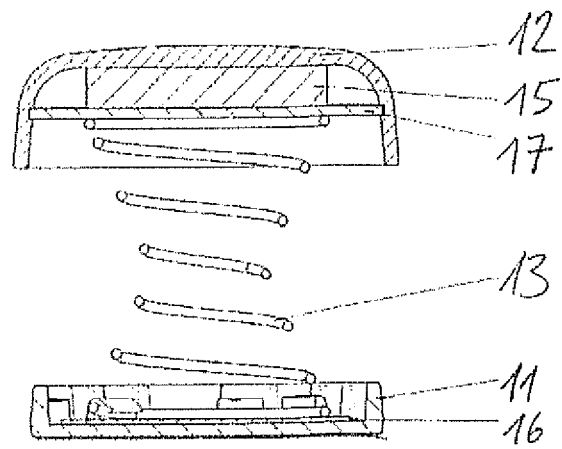
FIG. 6 shows the holding device with a coil spring and a magnetic lock in the operating position.

FIGS. 1 and 2 respectively show perspective views from behind of a smartphone S with a holding device 1 according to the invention arranged thereon. Here, the holding device 1 is shown in its flat collapsed resting position on the smartphone in FIG. 1, and in its extended operating position in FIG. 2. FIGS. 3 and 4 show views corresponding to FIGS. 1 and 2, but in side view. FIG. 5 shows the holding device 1 separately.

The holding device 1 is made up of a device-side end part 11, an outer end part 12, i.e. an end part that is remote from the device in the state of use and serves as a gripping piece, and a coil spring element 13 extending between both end parts 11 and 12.

The device-side end part 11 can be attached to the backside of the housing of a smartphone or a similar device, e.g. by gluing, or it can a priori be integrated into a back wall of the housing, or it can even be connected to or formed integrally with a flat half shell or an X holster for holding the device.

The spring element 13 configured as a helically coiled compression spring is connected to both end parts 11 and 12 and holds the outer end part 12 that serves as a gripping piece in the operating position (FIGS. 2, 4 and 5) with a distance to the device-side end part 11. In the resting position (FIGS. 1 and 3), the spring element 13 is flat compressed, and the outer end part 12 is locked to the device-side end part 11 in such a way that the holding device 1 is flat collapsed and only protrudes above the backside from the device minimally, that is with the width of the outer end part 12 that engages over the device-side end part 11 in the resting position.

The locking of the outer end part 12 on the device-side end part 11 can be achieved by a bayonet lock 14, as shown in the exemplary embodiment, or by a screw connection, a rotary locking connection or any type of latching connection.

The bayonet lock shown in the exemplary embodiment is advantageous because it presents a latching rotary lock that can easily be released by rotation and has the additional advantage over a screw connection in that it cannot be released inadvertently. Releasing the lock is easier with such a bayonet connection than with other latching connections where the outer end part 12 would have to be unlocked from the device-side end part 11 by a pulling motion. It is also conceivable to use a latch by means of resilient latching elements that can be actuated with the fingers, are arranged in a diametrically opposed manner on the outer end part 12, latch into counter elements on the inner periphery of the device-side end part 11 and can be unlocked by finger pressure.

As shown, the spring element 13 is specifically configured in a way that the coil spring forming the spring element 13 has the smallest diameter in the middle and extends in diameter both towards the device-side end part 11 and towards the outer end part 12. This is advantageous in that the connection of the spring element 13 to both end pads 11 and 12 is achieved with a larger outer diameter, thus creating a highly stable connection; still, the spring coils come to rest one within the other during the flat compression into the resting position and allow for a very small packing height in the collapsed state. After unlocking of the outer end part 12, the spring element 13 urges the outer end part 12 away from the device-side end part 11 into the operating position shown in the drawings.

The double-cone configuration of the spring element 13 in the exemplary embodiment shown is also advantageous for gripping, since the user can put one finger into the central annular neck formed by the smallest diameter of the spring element in that point, thus allowing for both comfortable and stable holding of the device.

Figure 7:
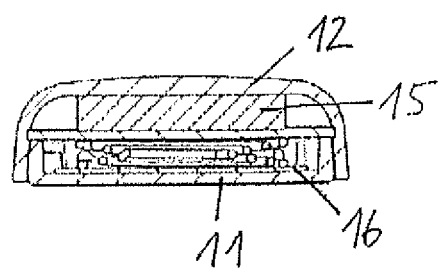
FIG. 7 shows the holding device with the coil spring and the magnetic lock in the resting position.

FIGS. 6 and 7 show a variation of the above described exemplary embodiment that uses a spring element 13 configured as a coil spring as a resilient intermediate element between the device-side end part 11 and the outer end part 12. This embodiment differs from the embodiment described above in that the locking in the flat compressed resting position is achieved magnetically instead of mechanically locking the outer end part 12 on the device-side end part 11. For this purpose, the outer end part 12 is provided with a flat, plate-shaped magnet 15 attached to its inner side or underside. A holding plate 17 disposed between the magnet 15 and the spring element 13 serves for connecting the spring element 13 and furthermore supports the mounting of the magnet 15 on the outer end part 12.

In deviation from the above, the holding plate 17 can be omitted if the magnet 15 is connected to the outer end part 12 in a sufficiently secure manner, e.g. by gluing, and the spring element 13 is directly connected to the outer end part 12 around the periphery of the magnet 15.

The device-side end part 11 is provided with a built-in iron plate 16 that cooperates with the magnet 15 in the flat compressed resting position.

FIG. 7 shows the embodiment according to FIG. 6 in the flat compressed resting position. While in the operating position shown in FIG. 6 the magnet 14 due to its large spatial distance from the iron plate 16 does not create an effective attraction force, in the flat compressed resting position according to FIG. 7 there is a highly effective attraction force between the magnet 15 and the iron plate 16, because of the now very small distance of the magnet 15 from the iron plate 16. This force is significantly higher than the spring force of the compressed spring element 13 that is opposed to this attraction force, and thus holds the holding device in its flat compressed resting position.

Departing from the previously described embodiments wherein the spring element 13 is a compression spring, the spring element 13 can alternatively be a tension spring. For use, the outer end part 12 can then be pulled apart from the device-side end part 11 by applying tension, and the user's fingers holding the device will prevent the outer end part 12 from returning to the resting position. While the outer end part 12 is not self-remaining in its extended operating position apart from the device-side end part 11, this embodiment allows for firm holding the device by the user because the tension of the spring is drawing the outer end part 12 against the user's fingers when the reduced diameter middle part of the double cone configuration of the spring element 13 is held between two fingers of the user.

If the spring element 13 is a tension spring, the locking of the outer end part 12 on the device-side end part 11 in the resting position can be effected either only elastically by the tension of the spring element 13 or additionally by a mechanical or magnetic latching device, as previously described.

Figure 8:
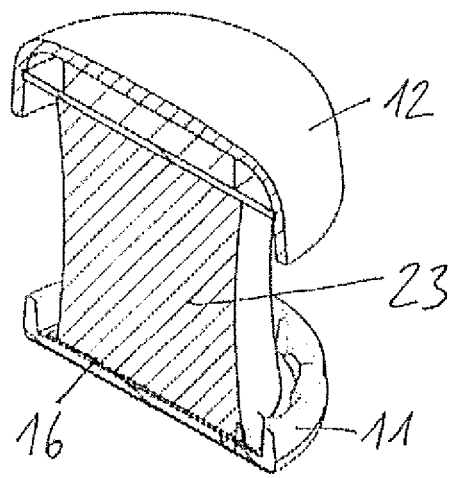
FIG. 8 shows a holding device with a resilient intermediate element in the operating position, in a half-sectioned view shown in perspective.
Figure 9:
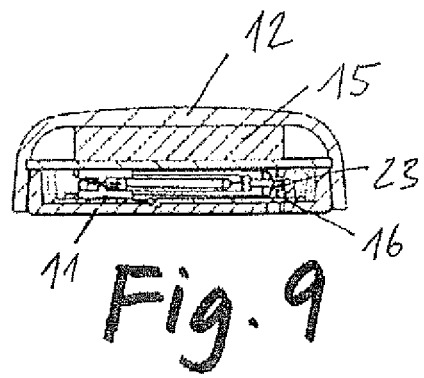
FIG. 9 shows the holding device with the resilient intermediate element in the resting position.

FIGS. 8 and 9 show a modified embodiment with the same principle of operation. Here, however, the spring element 13 of the above described embodiments that serves as the resilient intermediate element between the device-side end part 11 and the outer end part 12 and is configured as a coil spring is replaced with an alternative resilient intermediate element 23 made of plastic foam or rubber foam. This element can be configured as a virtually massive body, as shown schematically in FIG. 8, or as a thick-walled hollow body, or can even be formed by a tube-like spring-resilient rubber sleeve.

In this variation according to FIGS. 8 and 9 too, the exemplary embodiment is provided with a magnetic lock that is, as with the exemplary embodiment according to FIGS. 6 and 7, made up of a magnet 15 with plate-like configuration attached in the outer end part 12 by means of a holding plate 17, and, in cooperation therewith, an iron plate 16 installed into the device-side end part 11.

However, it will be appreciated that even with embodiments having such a modified resilient intermediate element 23 mechanical locks such as the ones discussed above can be used for locking in the resting position.

In the magnet locks in the embodiments according to FIGS. 6 to 9, the magnet 15 is arranged on the outer end part 11 and the iron plate 16 on the device-side end part 11, respectively. This arrangement is of course reversible such that the magnet 15 can be arranged on the device-side end part 11 and the iron plate 16 on the outer end part 12.

The outer end part 12 and the device-side end part 11 are preferably made of plastics and are therefore non-magnetic. Another embodiment can be realized if the respective end part is itself made of magnetically conductive iron and thus forms the iron plate itself, instead of using a built-in iron plate 16.

Figure 10:
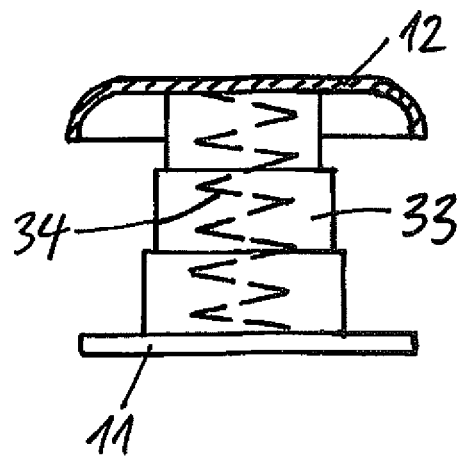
FIG. 10 shows a holding device with a spring-loaded mechanical intermediate element in the form of a telescopic tube.
Figure 11:
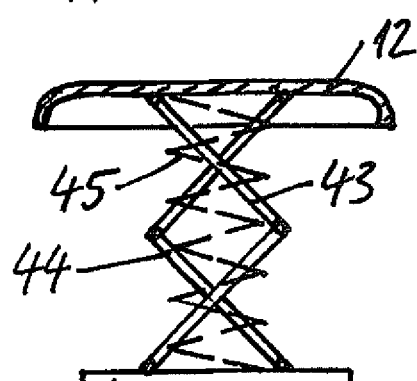
FIG. 11 shows a holding device with a spring-loaded mechanical intermediate element in the form of a linkage.

FIGS. 10 and 11 show further embodiments of the inventive holding device, wherein in each case a mechanically extendible intermediate element is provided between the device-side end part 11 and the outer end part 12.

In the embodiment of FIG. 10, the intermediate element 33 consists of a telescopic tube with several nested telescopic tube elements that each have only a relatively short axial length in order to allow for a flat resting position. Preferably, a spring 34 is arranged within the telescopic tube arrangement 33. This spring 34 can be configured either as a compression spring biasing the outer end part 12 away from the device-side end part 11 into the operating position, or as a tension spring biasing the outer end part 12 towards the device-side end part 11 into the resting position.

In the first case, when the spring 34 is configured as a compression spring, a mechanical or magnetic lock of the outer end part 12 on the device-side end part 11 in the resting position may be provided in any of the above described embodiments. In the latter case, when the spring 34 is configured as a tension spring, mechanical latches, for example in the form of nubs and indentations (not shown), can be present between the individual telescopic tube elements. These latches will latch in the expanded state, that is, in the operating position, and can be unlatched by pressing onto the outer end part 12 in order to close the mechanism. The spring 34 then brings the holding device into the flat collapsed resting position.

The spring 34 may even be omitted if the mechanical or magnetic lock of the outer end part 12 on the device-side end part 11 in the resting position is provided, and the telescopic tube elements can either be latched the extended operating position by nubs or are provided with sufficient mutual friction therebetween in order to stay in position after extending them into the operating position, until the holding device is again compressed into the resting position.

In the embodiment shown in FIG. 11, opposingly arranged joint supports 43, 44 are used that in each case consist of two rods connected with each other and to the device-side end part 11 and into the outer end part 12, respectively; the rods are in each case movable between a flat collapsed configuration in the resting position and the extended configuration in the operating position that is shown here. A compression spring 45 biases the outer end part 12 away from the device-side end part 11 and into the operating position, and in the resting position, the outer end part 12 can be fixed to the device-side end part 11 in any one of the above described embodiments by means of a mechanical or magnetic lock. The joint support arrangement may of course present other numbers and configurations of joint supports.

Figure 12:
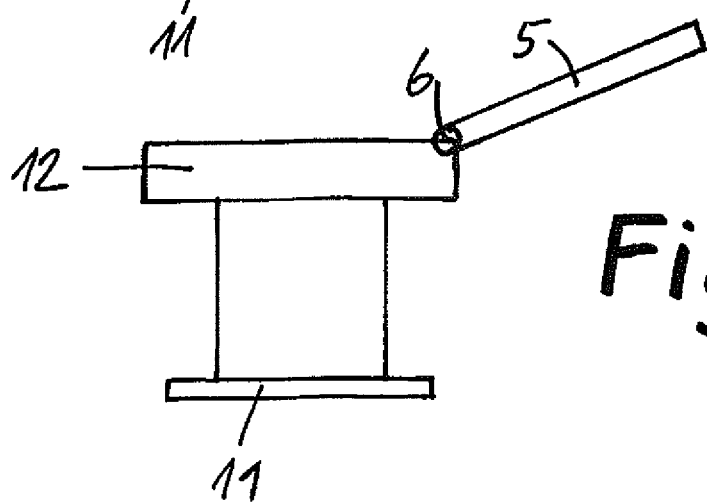
FIG. 12 shows a schematically indicated holding device with a lid element that can be folded out.

FIG. 12 shows a supplement to the inventive holding device, shown here only schematically, by means of a foldout lid 5 arranged on the outer end part 12 and connected thereto via a hinged joint 6. This lid is provided in order to improve the grip of the holding device with the fingers of the user in that the lid 5 in its folded-out position bears against the back of the fingers and thus improves the holding experience.

The lid 5 may be configured in such a way that it is biased towards its folded-out position, e. g. by means of a torsion spring (not shown), or the hinged joint 6 may be configured such that the lid can latch into the folded-out position. The lid 5 can be latched to the remaining portion of the outer end part 12. It can also be configured in such a way that it simultaneously effects the latching or locking on the device-side end part 11 in a position folded onto the remaining portion of the outer end part 12 when it is in the resting position.

Figure 13:
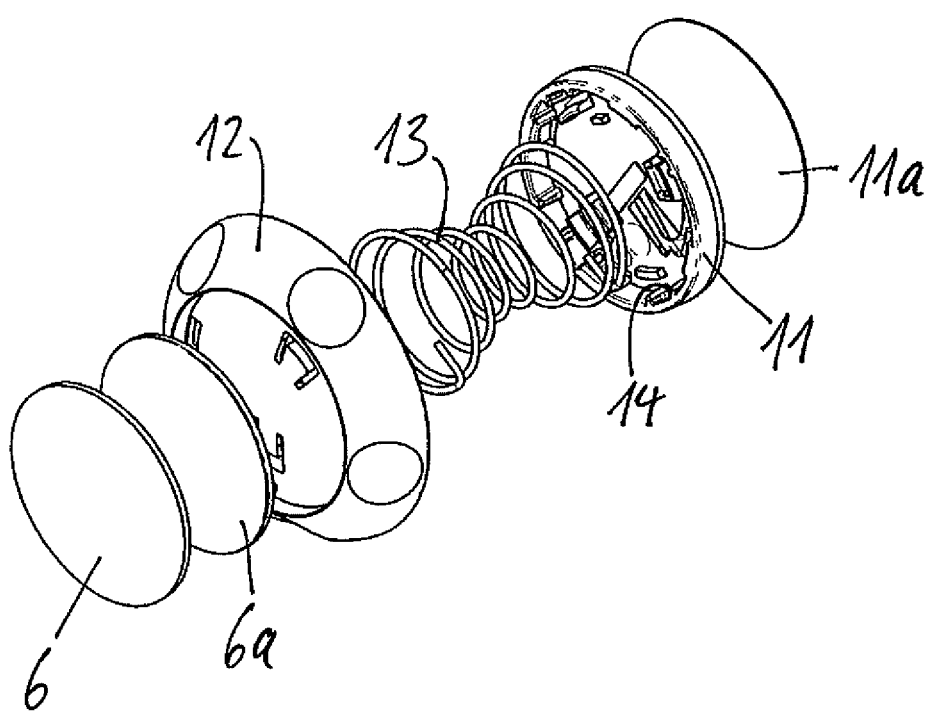
FIG. 13 shows a holding device with a coil spring and a mirror in an exploded perspective view.

FIG. 13 shows in an exploded perspective view an embodiment as also depicted in FIGS. 1 to 5, having a double cone coil spring as a spring element 13 for connecting the device-side end part 11 with the outer end part 12, and with a bayonet lock 14 between the two end parts 11 and 12. An adhesive layer 11a is provided for adhesive fixing of the device-side end part 11 to the back side of the smartphone casing.

In the embodiment shown in FIG. 13 the outer end part 12 also serves as a carrier for a mirror 6 which for instance can be fixed by means of an adhesive layer 6a in a recess in the upper surface of the outer end part 12. Mirror 6 can be used for adjusting the smartphone for making selfies and also by ladies as a makeup mirror.

In the embodiment previously described and shown in FIG. 12, lid 5 can also comprise a mirror.

It will be appreciated that the embodiments described above and shown in the drawings are merely exemplary in nature and that individual elements may also be combined differently than shown in these exemplary embodiments.

That which is claimed is:

1. A holding device, in particular for mobile phones, the holding device being adjustable between a flat collapsed resting position and an extended operating position, with a phone-side end part connected or connectable to the phone, an outer end part, and a resilient construction element connecting both end parts and holding the outer end part spaced apart from the phone-side end part in the operating position, wherein, in the resting position, the resilient construction element is flat compressed and the outer end part is lockable on the phone-side end part,
    wherein the outer end part is configured as a gripping piece and the resilient construction element is configured as a helically coiled compression spring or tension spring having a double cone shape by extending in diameter from a central area with the smallest diameter both towards the phone-side end part as well as towards the outer end part.

2. A holding device according to claim 1, wherein the locking mechanism of the outer end part on the phone-side end part in the resting position is selected from the group consisting of a bayonet lock, a latching bayonet lock, a screw lock, a rotary clamping lock, and a latching connection.

3. A holding device according to claim 1, wherein the locking of the outer end part on an inner end part in the resting position is configured as a magnetic lock comprising a magnet arranged on one of the outer end part and the phone-side end part, and an iron plate arranged on or formed by the respective other end part.

4. A holding device according to claim 1, wherein the outer end part carries a mirror.

5. A holding device according to claim 1, wherein the outer end part has a foldout lid connected thereto by means of a hinged joint, the lid being able to bear against the backside of the finger of the user in the operating position of the holding device.

* * * * *